United States Patent
Nguyen et al.

(10) Patent No.: US 11,900,116 B1
(45) Date of Patent: Feb. 13, 2024

(54) LOOSELY-COUPLED SLICE TARGET FILE DATA

(71) Applicant: International Business Machines Corporation, Armonk, NY (US)

(72) Inventors: Dung Q. Nguyen, Austin, TX (US); Brian W. Thompto, Austin, TX (US); Jose E. Moreira, Irvington, NY (US); Jessica Hui-Chun Tseng, Fremont, CA (US); Pratap C. Pattnaik, Yorktown Heights, NY (US); Kattamuri Ekanadham, Mohegan Lake, NY (US); Manoj Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/489,746

(22) Filed: Sep. 29, 2021

(51) Int. Cl.
*G06F 9/30* (2018.01)
*G06F 9/38* (2018.01)

(52) U.S. Cl.
CPC ...... *G06F 9/30145* (2013.01); *G06F 9/30036* (2013.01); *G06F 9/30109* (2013.01); *G06F 9/3836* (2013.01); *G06F 9/3869* (2013.01)

(58) Field of Classification Search
CPC ............. G06F 9/30145; G06F 9/30036; G06F 9/30109; G06F 9/3836; G06F 9/3869
See application file for complete search history.

(56) References Cited

U.S. PATENT DOCUMENTS

| | | | |
|---|---|---|---|
| 5,502,826 A | 3/1996 | Vassiliadis | |
| 6,282,634 B1 | 8/2001 | Hinds | |
| 6,330,657 B1 | 12/2001 | Col | |
| 6,453,412 B1 | 9/2002 | Henry | |
| 9,740,486 B2 | 8/2017 | Boersma | |
| 10,534,615 B2 | 1/2020 | Park | |
| 11,157,280 B2 | 10/2021 | Boersma | |
| 2004/0193838 A1 | 9/2004 | Devaney | |
| 2005/0038977 A1* | 2/2005 | Glew | G06F 9/30112 712/E9.035 |
| 2007/0260855 A1 | 11/2007 | Gschwind | |
| 2008/0114970 A1 | 5/2008 | Colavin | |
| 2013/0086363 A1* | 4/2013 | Gschwind | G06F 9/30185 712/E9.016 |
| 2015/0149744 A1 | 5/2015 | Pedersen | |

(Continued)

OTHER PUBLICATIONS

List of IBM Patents or Patent Applications Treated as Related, Sep. 29, 2021, 2 pages.

(Continued)

*Primary Examiner* — Zachary K Huson
(74) *Attorney, Agent, or Firm* — Jared C. Chaney (57) ABSTRACT

A system may determine that two instructions may be combined based on a processing power of the processor and a size of the instructions, fuse the two instructions into a pair, map the two instructions with a single register tag, write the register tag into a mapper with bits indicating that the register tag is for a first instruction of the two instructions, write the register tag into the mapper with bits indicating that the register tag is for a second instruction of the two instructions, write the fused instruction pair into an issue queue, issue the fused instruction pair to a vector-scalar transformation units (VSU), and execute the two instructions.

20 Claims, 4 Drawing Sheets

(56) References Cited

U.S. PATENT DOCUMENTS

| | | |
|---|---|---|
| 2016/0026607 A1 | 1/2016 | Codrescu |
| 2016/0070571 A1 | 3/2016 | Boersma |
| 2018/0107510 A1 | 4/2018 | Carlough |
| 2019/0163475 A1 | 5/2019 | King |
| 2019/0179639 A1 | 6/2019 | Boersma |
| 2020/0042321 A1* | 2/2020 | Genden ................ G06F 9/3885 |
| 2020/0167166 A1 | 5/2020 | Genden |
| 2020/0278868 A1 | 9/2020 | Boersma |

OTHER PUBLICATIONS

Nguyen et al., "Tightly-Coupled Slice Target File Data," U.S. Appl. No. 17/489,754, filed Sep. 29, 2021.
International Search Report and Written Opinion for Application PCT/EP2022/074893 dated Dec. 22, 2022, 10 pages.

\* cited by examiner

FIG. 4

LOOSELY-COUPLED SLICE TARGET FILE DATA

BACKGROUND

Aspects of the present disclosure relate to vector-scalar transformation units (VSU), more particular aspects relate to loosely-coupled slice target file (STF) data.

The processor chip POWER10 is a 7 nanometer (nm) CMOS design, with a die size of 602 mm2, using an 18-layer metal stack. It is available in single-chip or dual-chip sockets. The top-level system architectural attributes are captured in Table I. Two of the major distinguishing operational features of POWER10 over POWER9 include: (a) significant improvements in energy efficiency; and (b) AI enhancement of the core featuring ISA extensions and inline MMA (Matrix-Multiply Assist) acceleration.

A scalar processor acts on one piece of data at a time. A vector processor acts on several pieces of data with a single instruction.

BRIEF SUMMARY

The present disclosure provides a method, computer program product, and system creating loosely-coupled slice target file (STF) data. In some embodiments, the method includes determining that two instructions may be combined based on a processing power of the processor and a size of the instructions, fusing the two instructions into a pair, map the two instructions with a single register tag, writing the register tag into a mapper with bits indicating that the register tag is for a first instruction of the two instructions, writing the register tag into the mapper with bits indicating that the register tag is for a second instruction of the two instructions, writing the fused instruction pair into an issue queue, issuing the fused instruction pair to a vector-scalar transformation units (VSU), and execute the two instructions.

Some embodiments of the present disclosure can also be illustrated by a computer program product comprising a computer readable storage medium having program instructions embodied therewith, the program instructions executable by a processor to cause the processors to perform a method, the method comprising determining that two instructions may be combined based on a processing power of the processor and a size of the instructions, fusing the two instructions into a pair, map the two instructions with a single register tag, writing the register tag into a mapper with bits indicating that the register tag is for a first instruction of the two instructions, writing the register tag into the mapper with bits indicating that the register tag is for a second instruction of the two instructions, writing the fused instruction pair into an issue queue, issuing the fused instruction pair to a vector-scalar transformation units (VSU), and execute the two instructions.

Some embodiments of the present disclosure can also be illustrated by a system comprising a processor and a memory in communication with the processor, the memory containing program instructions that, when executed by the processor, are configured to cause the processor to perform a method, the method comprising determining that two instructions may be combined based on a processing power of the processor and a size of the instructions, fusing the two instructions into a pair, map the two instructions with a single register tag, writing the register tag into a mapper with bits indicating that the register tag is for a first instruction of the two instructions, writing the register tag into the mapper with bits indicating that the register tag is for a second instruction of the two instructions, writing the fused instruction pair into an issue queue, issuing the fused instruction pair to a vector-scalar transformation units (VSU), and execute the two instructions.

DETAILED DESCRIPTION

Aspects of the present disclosure relate to creating loosely-coupled slice target file (STF) data. While the present disclosure is not necessarily limited to such applications, various aspects of the disclosure may be appreciated through a discussion of various examples using this context.

In modern processing units there are multiple cores that are able to process multiple instruction independently. For example, in power 10 processor, there are four vector-scalar transformation units (VSU) execution units, which are capable of executing a total of 4 VSU instructions per cycle (i.e., four 128-bit vector instructions, or four 64-bit scalar instructions, or a mixed of four 128-bit vector and 64-bit scalar instructions).

A new horizontal fusion design proposed by this disclosure enables the core to increase the execution rate of scalar instructions. For example, in power 10 processing units, aspects of this disclosure may enable increasing the execution rate from 4 to 8 per cycle. With this new design, a core may be able to execute vector instructions equal to the maximum processing power for each unit, and/or multiple smaller vector instructions without adding additional VSU processing pipes. For example, the power 10 processing unit may execute up to four VSU 128-bit vector instructions, or eight VSU 64-bit scalar instructions, or a mixture of both.

Microprocessor architectures utilize a variety of registers to store data for execution/manipulation by instructions. In order to track which registers (or locations within registers) store data for particular instructions, microprocessor utilize a register file (or more than one register file). The register file holds the register locations needed for various instructions being executed by the hardware threads in the superslice. In some processors, the register file may be broken up into blocks. For example, in some POWER® processors, the register file is called a Slice Target Register File (STF), and it is composed of four smaller STF blocks working together to provide the core with a large register file. (POWER is a registered trademark owned by International Business Machines Corporation).

In order to ensure that multiple instructions do not attempt to store different data in the same location, the microprocessor assigns register tags to instructions. In some instances, register tags may be called slice target register file tags (STF tags) herein, but other names or types of tags are possible. Unused register tags can be kept in a free list (e.g., STF free list). In some instances, a free list keeps track of unallocated physical registers. When an instruction is received at dispatch, the processor checks for available registers. If a register is available, the processor assigns a register tag from the free list to the instruction, and the instruction is able to proceed with the associated tag. Once a register tag is assigned, it is removed from the free list, and the corresponding entry in the register file (and, therefore, register location) cannot be assigned to a new instruction. The use of register tags and register files allows the processor to ensure that instructions do not collide (e.g., overwrite data still needed by another instruction).

In some embodiments, the proposed system may load multiple instructions onto a single register tag to be processed in a single pipeline.

In some embodiments, a write/read (W/R) is allocated such that the fused pair may be issued out the issue queue (ISQ). For example, each STF (e.g., a register tag) block may be 2 W/6R for 128 bits of data. In this example, the 6R is allocated to enable the fused scalar pair to be issued out of the ISQ.

In some embodiments, the write/read (W/R) is allocated such that the scalar instruction can write identical results to both halves of a single STF register entry as in the case of a tightly-coupled STF design. The dependent instruction can read the same scalar data on either half of the STF entry.

In some embodiments, the write/read (W/R) is allocated such that the scalar instruction can write results to only half of a STF entry, as in the case of a loosely-coupled STF design. The scalar result can only write to either the right half of the STF entry, or the left half of the STF entry. The dependent instruction must know whether the operand data is on the left half or the right half of a STF entry.

Embodiments of the present disclosure will now be discussed with reference to the figures.

Figure 1:
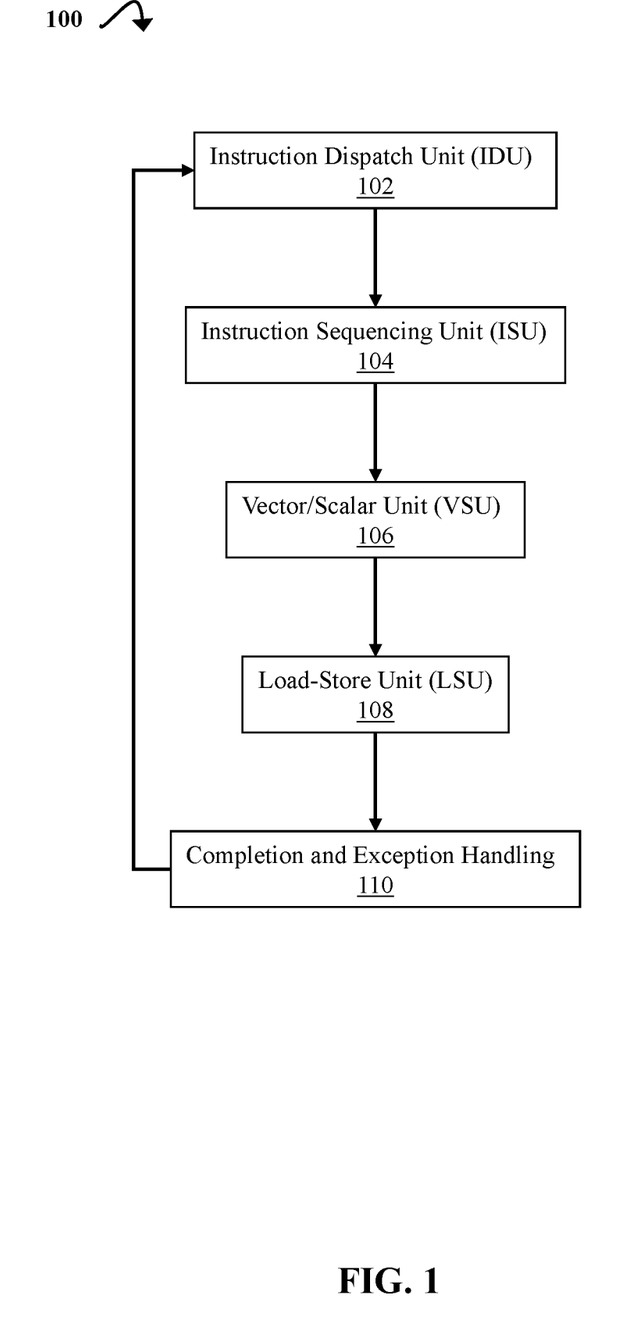
FIG. 1 illustrates a block diagram of a processor core, according to various embodiments of the present disclosure.

Referring now to FIG. 1, illustrated is a high-level block diagram of various components of an example microprocessor system 100, in accordance with embodiments of the present disclosure. The microprocessor system 100 includes an instruction dispatch unit (IDU) 102, an instruction sequencing unit (ISU) 104, a load-store unit (LSU) 108, a vector/scalar unit (VSU) 106, and completion and exception handling logic 110.

The IDU 102 is a processing unit responsible for organizing program instructions to be fetched from memory, and executed, in an appropriate order. IDU 102 is often considered to be part of the control unit (e.g., the unit responsible for directing operation of the processor) of a central processing unit (CPU). In some embodiments, the IDU may fuse two adjacent scalar instructions, as described in FIG. 2.

The ISU 104 is a computing unit responsible for dispatching instructions to issue queues, renaming registers to support out-of-order execution, issuing instructions from issue queues to execution pipelines, completing executing instructions, and handling exceptions. The ISU 104 includes an issue queue that issues all of the instructions once the dependencies and combination of instructions are resolved.

The VSU 106 is a computing unit that maintains ownership of a slice target file (STF). The STF holds all of the register data sourced by the instructions. Taking a store instruction that does not have a target as an example, the STF holds the registers needed for the store address operands and the store data that is sent to the LSU 108 for execution.

The LSU 108 is an execution unit responsible for executing all load and store instructions, managing the interface of the core of the processor with the rest of the systems using a unified cache, and performing address translation. For example, the LSU 108 generates virtual addresses of load and store operations, and it loads data from memory (for a load operations), or stores data to the memory from registers (for a store operation). The LSU 108 may include a queue for memory instructions, and the LSU 108 may operate independently from the other units.

The completion and exception handling logic 110 (hereinafter "completion logic" 110) is responsible for completing the instructions. If the instruction causes an exception, the completion logic 110 flushes the instruction and signals to the IDU to re-fetch the instruction.

It is to be understood that the components 102-110 shown in FIG. 1 are provided for illustrative purposes and to explain the principles of the embodiments of the present disclosure. Some processor architectures may include more, fewer, or different components, and the various functions of the components 102-110 may be performed by different components in some embodiments. For example, the exception and completion handling may be performed by the ISU 104.

Additionally, processors may include more than one of the components 102-110. For example, a multi-core processor may include one or more instruction fetch units (IDUs) 102 per core. Furthermore, while the embodiments of the present disclosure are generally discussed with reference to POWER® processors, this is done for illustrative purposes. The present disclosure may be implemented by other processor architectures, the disclosure is not to be limited to POWER processors.

Figure 2:
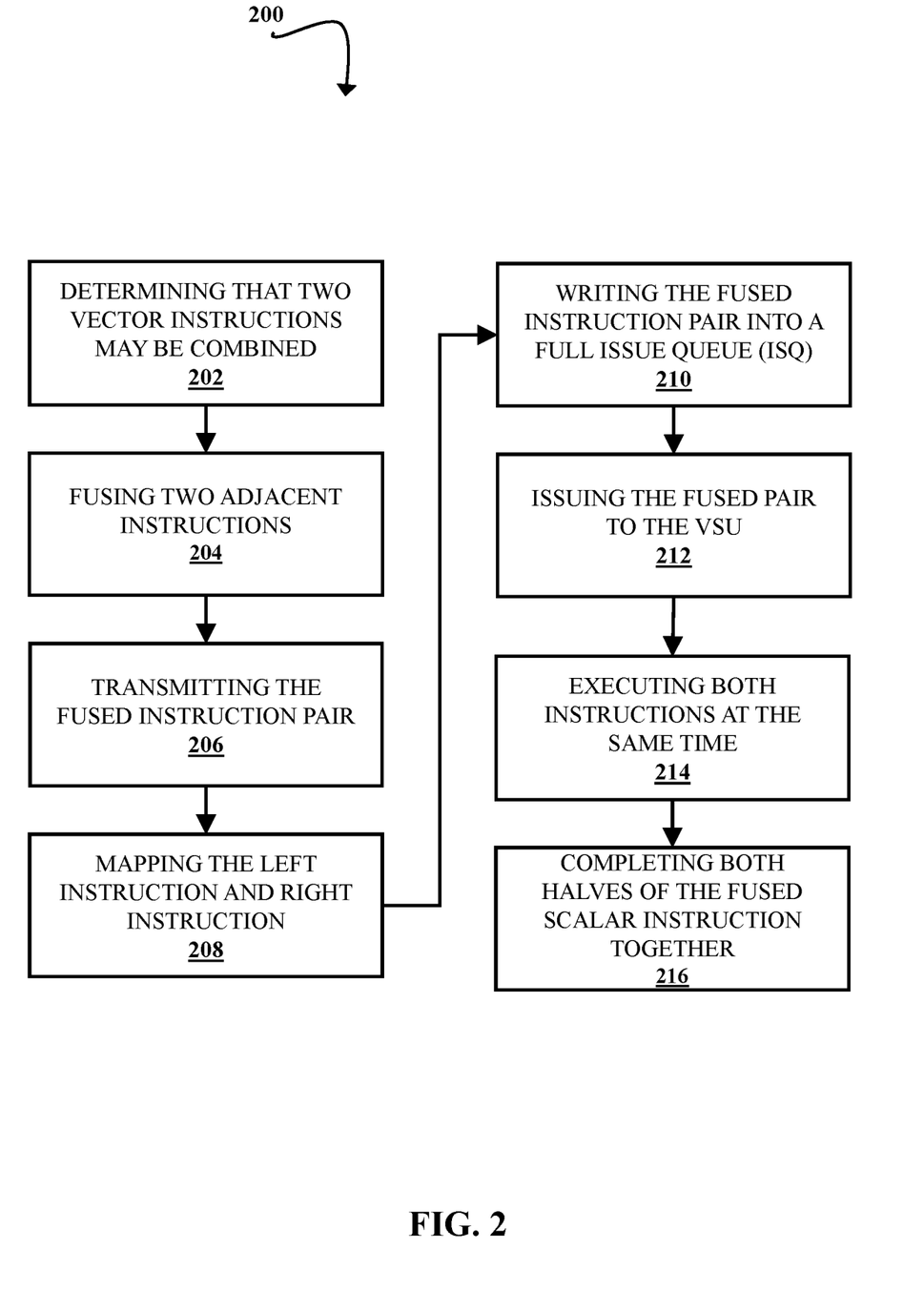
FIG. 2 illustrates an example method of coupling STF data, according to various embodiments of the present disclosure.

FIG. 2 depicts an example method 200 for loosely coupling register tag data. Operations of method 200 may be enacted by one or more computer systems such as the system described in FIG. 3 below.

Method 200 begins with operation 202 of an instruction dispatch unit (IDU) (e.g., IDU 102 from FIG. 1) determining that two instructions may be combined based on the processing power of the unit and the size of the instructions. If the unit has the power to process two instructions simultaneously, the IDU may make the determination that the instructions may be combined. For example, if a VSU slice can execute a 128-bit vector instruction, and the system has two 64-bit scalar instructions, the IDU may make a determination that the two 64-bit scalar instructions may be combined and processed simultaneously by the VSU slice. The instructions may be called left instruction and right instructions herein, but this distinction is not to be linked to a physical limitation for the processor, it is merely a way of differentiating the two instructions. Likewise, later the vector scalar unit (VSU) may be referenced as having a left side and right side. Again, denoting that part of the 128-bit capacity of the VSU is allocated to the left instruction and part of the capacity is allocated to the right instruction is not intended to indicate anything unique about either the left or right "side"/instruction, but rather it is used for purposes of illustration and clarity of discussion.

Method 200 may continue with operation 204 of fusing two adjacent instructions into a pair. For example, the instructions may be scalar instructions. In some instances, adjacent instructions are instructions that can be executed simultaneously. For example, adjacent instructions are not dependent on each other. In some embodiments, adjacent instructions are instructions that may be completed at the same time and are not directly dependent on each other.

In some embodiments, dispatch logic in the processor may write an instruction tag (ITAG) for a received instruction into a mapper. In some instances, a data mapper executes bidirectional transfer of data between a persistent data store such as a relational database and in-memory data representation such as the domain layer. The save and restore buffer (SRB) tracks prior mappings for a given register. For example, if the processor writes to a particular general-purpose register (GPR) vector scalar register (VSR) five times, the mapper only has the newest one, while the SRB may store the four historical ITAGs. The purpose of the SRB is to back up the processor state in the event that the processor has to perform a flush. The dispatch logic also dispatches the instructions to the ISQ. In some embodiments, these operations are performed without a register tag being assigned to the instructions.

In some embodiments, the fused instruction may have 2 ITAGs. In some embodiments, the first ITAG is an even ITAG. For example, the IDU may select the least significant bit and make it even (e.g., 0) for the first tag. Then, the IDU only needs to send the first ITAG because later the least significant bit may be flipped (e.g., make it odd, 1) to get the second ITAG.

The ITAG is an instruction tag that facilitates tracking of the instruction. The processor assigns a tag for every instruction that comes down, so that the instruction may be tracked. An ITAG tracks an instruction from decode to completion. The ITAG may be implemented as a set of binary bits.

In some instances, W bits are written bits which indicate in a binary manner whether the data is ready or is available. The W bits may be provided in a form indicating yes/no, affirmative/negative, etc. If the W bit is positive, the system places less concern on the ITAG, because the data is already there and which elements provided the data becomes less relevant. If the W bit is negative, the ITAG indicates which elements the processing is waiting for before the instruction may be executed. The W bit may be referred to as a data-availability written bit.

Method 200 may continue with operation 206 where the IDU may transmit the fused instruction to the instruction sequencing unit (ISU). For example, the IDU may transmit the fused instruction to the ISU on a pair lane. Pair lanes are data-transmission lanes, connected serially. Each lane consists of two pairs of wires, one for transmitting and one for receiving.

Method 200 may continue with operation 208 where the instruction sequencing unit (e.g., ISU 104) maps the left instruction and right instruction. In some embodiments, the left instruction and the right instruction may be mapped separately. For example, the left and right instructions are to be processed separately and have a separate resolution, so the mapping may need to be separate.

In some embodiments, the system may write the ITAGs into a completion table and mark them as atomic (i.e., both ITAGs must be completed together). For example, the ISU may write the even ITAG and the odd ITAG for the fused pair in a completion table.

The mapper may access a STF Free-List allocates a single available STF tag (e.g., a register tag) (128-bit) to the fused pair. For example, a mapper may be part of the ISU, and the mapper may receive a free-list of available STF tags. The mapper may select a free STF tag for the fused pair.

In some embodiments, ISU may write the STF tag into the mapper, along with two bits that indicate whether the STF tag is for the left bits or the right bits of the STF tag. Since the fused instructions are issued a single STF tag, the system needs to determine what instructional information for the STF tag is left instruction data and what is right instruction data. For example, the destination logical register (RT) for a fused scalar pair is used to index into the mapper for a write operation. The Even ITAG instruction may be recorded in both the STF tag and the STF tag_left bit (e.g., with even bit "10"). The Odd ITAG instruction may be recorded in the STF tag along with STF tag_right bit (e.g., with odd bit tag "01").

For a vector instruction, only one mapper location may be written using the respective RT field, and both the STF tag_left and the STF tag_right may be active (e.g., even and odd bit "11").

As used herein, "source STF tags" are the STF tags that identify what physical registers the instructions are reading for the performance of operations. The source STF tags are inside the ISQ 330 before the instruction is starting to issue. The "destination STF tag" is the STF tag associated with the register that the instruction is actually writing to. The destination STF tag is fed back in to ISQ 330, mapper 320, and SRB 340 for instructions that have not issued out and are dependent on it. For example, assume there are back-to-back instructions that use a particular register (REG1). The first instruction writes to REG1, and the second instruction reads from REG1 and performs some operation on the data read from REG1. The destination STF tag for the first instruction is fed back into the ISQ (e.g., ISQ 330 in FIG. 3), mapper (e.g., mapper 320 in FIG. 3), and SRB (e.g., SRB 340 in FIG. 3) such that the second instruction can identify the proper register to read the data from. In other words, the destination STF tag for the first instruction acts as the source STF tag for the second instruction.

Method 200 may continue with operation 210 in which the ISU may write the fused instruction pair into a issue queue (ISQ) (e.g., a full issue queue) entry. In some embodiments, the fused scalar pair may be held in the ISQ until all six of the operands are ready. For example, the operands performed by one or more MUX (e.g., MUX 315 and MUX 316 from FIG. 3). Operand forwarding (or data forwarding) is an optimization in pipelined CPUs to limit performance deficits which occur due to pipeline stalls Method 200 may continue with operation 212, where the fused pair issues to the VSU. In some embodiments, the fused pair may not issue to the VSU until all six of the operands are ready.

In some embodiments, the ISQ may broadcast the even ITAG (with a fused pair indicator) to the mapper and the ISQs to wake up the ITAG dependencies.

In some embodiments, the ISQ and mapper may compare the Even ITAG for the even instruction, and flip the LSB of the Even ITAG to generate an Odd ITAG, which is used to compare against the Odd instruction.

Method 200 may continue with operation 214 where the VSU executes both scalar instructions at the same time.

Figure 3:
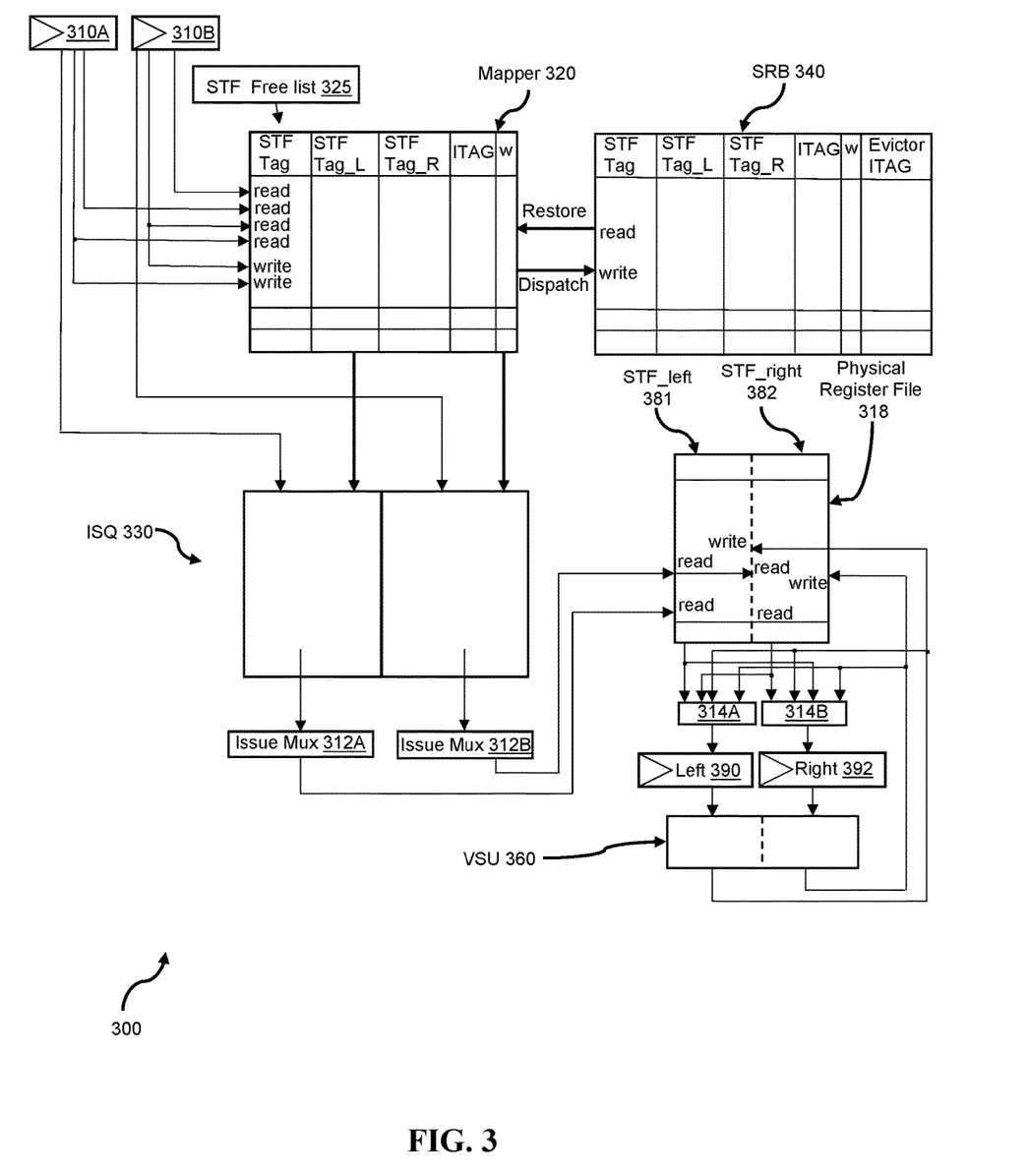
FIG. 3 illustrates a block diagram of an example microarchitecture of a processor configured couple STF data, in accordance with embodiments of the present disclosure.

In some embodiments, the fused instruction causes the system (e.g., the VSU) to read information from both STF left and STF right in the physical register (e.g., physical register file 318). If any of the operands of the fused instruction are on the opposite STF bank (left for STF right or right for STF left), then logic may steer the instructions to the correct operand latches.

In some embodiments, the scalar results are written in the correct register tag (left or right) based on the STF tag, STF tag_left, and STF tag_right bits. In some embodiments, the VSU (left and/or right) results can also be bypassed to the dependent scalar or fused scalar pair at the operand forwarding muxes (e.g., forwarding mux 314A or 314B).

In some embodiments, the VSU may then finish the instruction according to a "normal" (e.g., default to that system absent certain variables) procedure.

Method 200 may continue with operation 216 where the system completes both halves of the fused scalar instruction together. In some embodiments, completing both halves together means that the instructions are completed during the same cycle, the results are forwarded at the same time, the results are forwarded in the same package, and/or are reported to be completed at the same time.

In some embodiments, if an exception is caused by the fused instruction, then the completion logic may flush both halves of the fused instruction and tell the IDU to re-fetch the fused instruction as a two non-fused instructions. For example, if processing either the left or right instruction produces an error the system may not be able to trust the execution of either the left or right instruction. In an instance where an exception is detected, the system may process each instruction individually. In some embodiments, the system may resume the non-fused instruction execution from the first half of the original fused pair and then resume the second half of the original fused pair.

In some embodiments, the exception may be applied on the appropriate scalar half of the original fused instruction and the appropriate scalar half may be processed as the system would typically process an instruction with an exception.

Referring now to FIG. 3, illustrated is a block diagram of an example microprocessor 300 configured to couple register tag data, in accordance with embodiments of the present disclosure. The microprocessor 300 includes dispatch lanes (Ins0) 310A and (Ins1) 310B, a mapper 320, an issue queue (ISQ) 330, STF free list 325, a save and restore buffer (SRB) 340, vector scalar unit (VSU) 360, a left operand latch 390, and a right operand latch 392. While the various components in FIG. 3 are shown as standalone components, it is to be understood that various components may actually be sub-components of a larger component. It is also to be understood that microprocessor 300 could be configured such that one of the subcomponents performs an action of another subcomponent without departing from the scope of the disclosure.

In some embodiments, a left scalar instruction is provided to left operand latch 390 and a right scalar instruction is provided to right operand latch 392. Each operand latch may direct the instructions (left or right) to execution on the left or right of VSU 360.

A mux (e.g., issue mux 312A, issue mux 312B, forwarding mux 314A, and/or forwarding mux 314B) may be a multiplexer that may select between different streams and forward the selected stream further downstream in a process. A mux may be used to direct the left or right STF to the respective STF left 381 or STF right 382 side of the physical register file 318.

The instruction dispatch unit (IDU) (e.g., IDU 102) includes two dispatch lanes 310A and 310B for dispatching instructions (e.g., VSU). The instruction dispatch unit fuses two adjacent instructions into a pair. The fused instructions may have 2 instruction tags (ITAGs). In some embodiments, the first ITAG is always an even ITAG. For example, an IDU (e.g., IDU 102) may select the least significant bit and make it even (e.g., 0) for the first tag. Then, the IDU just needs to send the first ITAG because later the least significant bit may be flipped (e.g., make it odd, 1) to get the second ITAG. The instruction dispatch unit dispatches the instruction to the ISQ 330. The instruction dispatch unit also sends logical registers to the mapper 320 to be mapped to STF tags.

The instruction dispatch unit reads the mapper 320 to identify the producer ITAG and the source STF tag(s). It is to be understood that this is a simplified example for illustrative purposes, and that there is normally more than one source register, and each source register may have different producer instructions.

At the mapper 320, the VSR producer ITAG is compared to the ITAGs in the mapper 320. This is done using compare logic. At matched locations (i.e., locations where the producer ITAG matches the ITAG for an instruction in the mapper 320), the ready bit is set (e.g., set W=1) to indicate that the data needed by the instruction is stored in the register.

At the ISQ 330, the VSR producer ITAG is compared to the source ITAGs in the ISQ 330. At matched locations (i.e., locations where the producer ITAG matches the source ITAG for an instruction in the ISQ 330), the ready bit is set (e.g., set W=1).

At the SRB 340, the VSR producer ITAG is compared to the ITAGs in the SRB 340. At matched location (i.e., locations where the producer ITAG matches the ITAG for an instruction in the SRB 340), the ready bit is set (e.g., set W=1).

In some embodiments, the flush request may cause some number instructions to be flushed. In some embodiments, the microprocessor 300 may have numerous flush modes. For example, the microprocessor 300 may be configured to perform a flush after the NTC instruction has not received a tag for a given number of cycles. The microprocessor 300 may additionally, or alternatively, be configured to perform a flush if it determines that instructions are not executing at an expected rate (e.g., instructions are trickling out of the ISQ 330, which may indicate a lack of available STF tags). In some embodiments, the microprocessor 300 may be configured to perform a flush in response to the number of STF tags available in the free list being below a threshold. In some embodiments, microprocessor 300 may flush instructions if one of the fused instructions causes an exception. In some embodiments, the microprocessor 300 may considered a combination of the above (with or without other considerations) when determining whether to perform a flush. The type of flush (e.g., a full flush versus a mini-hang buster) may be determined based on which flush criterion is satisfied and/or the extent of the identified problem.

After a flush, data may be read from the SRB 340 to the mapper 320 to restore a previous state of the microprocessor 300.

Figure 4:
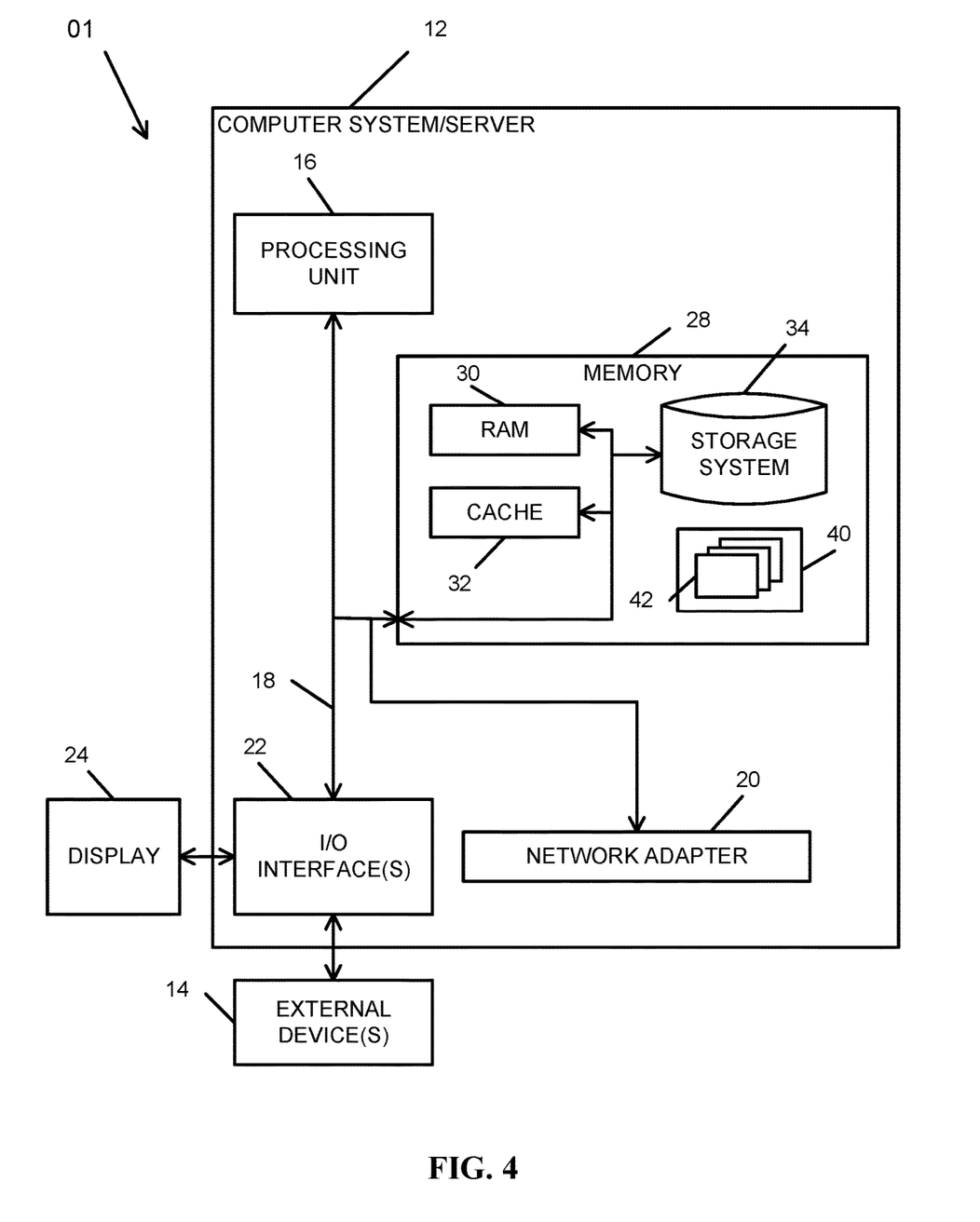
FIG. 4 depicts a computer system according to various embodiments of the present invention.

In an exemplary embodiment, the system (e.g., microprocessor system 100) includes computer system 01 as shown in FIG. 4 and computer system 01 may perform one or more of the functions/processes described above. Computer system 01 is only one example of a computer system and is not intended to suggest any limitation as to the scope of use or functionality of embodiments of the present invention. Regardless, computer system 01 is capable of being implemented to perform and/or performing any of the functionality/operations of the present invention.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As is further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a memory, and
   a processor in communication with the memory, the processor being configured to perform processes comprising:
   determining that two instructions may be combined based on a processing power of the processor and a size of the instructions;
   fusing the two instructions into a pair;
   mapping the two instructions with a single register tag;
   writing the register tag into a mapper with bits indicating that the register tag is for a first instruction of the two instructions;
   writing the register tag into the mapper with bits indicating that the register tag is for a second instruction of the two instructions;
   writing the fused instruction pair into an issue queue;
   issuing the fused instruction pair to a vector-scalar transformation units (VSU); and
   executing the two instructions.

2. The system of claim 1, wherein the determining is based on the processing power of the unit and the size of the instructions.

3. The system of claim 1, wherein the two instructions are adjacent instructions.

4. The system of claim 1, wherein the process further comprises:
   reading information from both register tags in a physical register.

5. The system of claim 4, wherein the process further comprises:
   steering operands of the fused instructions to one or more correct operand latches based on a location of the fused instructions.

6. The system of claim 5, wherein the process further comprises:
   writing scalar results for the fused instructions to a correct register tag based on the two register tags.

7. The system of claim 1,
   wherein the two instructions have two ITAGs,
   wherein the two ITAGs are the same except for a least significant bit;

wherein the least significant bit is even for the first instruction; and wherein the least significant bit is odd for the second instruction.

8. A method comprising:

determining that two instructions may be combined based on a processing power of the processor and a size of the instructions;

fusing the two instructions into a pair;

mapping the two instructions with a single register tag;

writing the register tag into a mapper with bits indicating that the register tag is for a first instruction of the two instructions;

writing the register tag into the mapper with bits indicating that the register tag is for a second instruction of the two instructions;

writing the fused instruction pair into an issue queue;

issuing the fused instruction pair to a vector-scalar transformation units (VSU); and executing the two instructions.

9. The method of claim 8, wherein the determining is based on the processing power of the unit and the size of the instructions.

10. The method of claim 8, wherein the two instructions are adjacent instructions.

11. The method of claim 8, wherein the process further comprises:

reading information from both register tags in a physical register.

12. The method of claim 11, wherein the process further comprises:

steering operands of the fused instructions to one or more correct operand latches based on a location of the fused instructions.

13. The method of claim 12, wherein the process further comprises:

writing scalar results for the fused instructions to a correct register tag based on the two register tags.

14. The method of claim 8, wherein the two instructions have two ITAGs, wherein the two ITAGs are the same except for a least significant bit;

wherein the least significant bit is even for the first instruction; and wherein the least significant bit is odd for the second instruction.

15. A computer program product comprising a computer readable storage medium having program instructions embodied therewith, the program instructions executable by a processor to cause the processors to perform a method, the method comprising:

determining that two instructions may be combined based on a processing power of the processor and a size of the instructions;

fusing the two instructions into a pair;

mapping the two instructions with a single register tag;

writing the register tag into a mapper with bits indicating that the register tag is for a first instruction of the two instructions;

writing the register tag into the mapper with bits indicating that the register tag is for a second instruction of the two instructions;

writing the fused instruction pair into an issue queue;

issuing the fused instruction pair to a vector-scalar transformation units (VSU); and executing the two instructions.

16. The computer program product of claim 15, wherein the determining is based on the processing power of the unit and the size of the instructions.

17. The computer program product of claim 15, wherein the two instructions are adjacent instructions.

18. The computer program product of claim 15, wherein the process further comprises:

reading information from both register tags in a physical register.

19. The computer program product of claim 18, wherein the process further comprises:

steering operands of the fused instructions to one or more correct operand latches based on a location of the fused instructions.

20. The computer program product of claim 19, wherein the process further comprises:

writing scalar results for the fused instructions to a correct register tag based on the two register tags.

* * * * *